United States Patent
Nakajima (10) Patent No.: US 8,770,358 B2
(45) Date of Patent: Jul. 8, 2014

(54) VARIABLE DAMPING FORCE DAMPER

(71) Applicant: Honda Motor Co., Ltd, Tokyo (JP)

(72) Inventor: Kiyoshi Nakajima, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 42 days.

(21) Appl. No.: 13/749,094

(22) Filed: Jan. 24, 2013

(65) Prior Publication Data

US 2013/0206521 A1 Aug. 15, 2013

(30) Foreign Application Priority Data

Feb. 15, 2012 (JP) ................. 2012-031006

(51) Int. Cl.
*F16F 9/53* (2006.01)
*F16F 9/46* (2006.01)
*F16F 9/50* (2006.01)
*F16F 9/34* (2006.01)
*F16F 9/348* (2006.01)

(52) U.S. Cl.
CPC . *F16F 9/50* (2013.01); *F16F 9/464* (2013.01); *F16F 9/34* (2013.01); *F16F 9/3482* (2013.01)
USPC .................................................. 188/267.2

(58) Field of Classification Search
USPC ............................................ 188/267–267.2
See application file for complete search history.

(56) References Cited

U.S. PATENT DOCUMENTS

| | | | |
|---|---|---|---|
| 6,336,535 B1 * | 1/2002 | Lisenker | 188/267.2 |
| 6,390,252 B1 * | 5/2002 | Namuduri et al. | 188/267.2 |
| 6,464,051 B2 * | 10/2002 | Lisenker et al. | 188/267.2 |
| 6,655,511 B1 * | 12/2003 | Lun et al. | 188/267 |
| 8,051,961 B2 * | 11/2011 | Azekatsu et al. | 188/267.2 |
| 8,240,439 B2 | 8/2012 | Nakajima et al. | |
| 2007/0193839 A1 * | 8/2007 | Nakajima et al. | 188/267.2 |
| 2008/0251982 A1 * | 10/2008 | Sekiya et al. | 267/140.14 |
| 2008/0277217 A1 * | 11/2008 | Nakajima et al. | 188/313 |
| 2009/0107779 A1 * | 4/2009 | Azekatsu et al. | 188/267.2 |

FOREIGN PATENT DOCUMENTS

| | | | |
|---|---|---|---|
| JP | 4599422 B2 | 12/2010 | |
| JP | 4825723 B2 | 11/2011 | |

* cited by examiner

*Primary Examiner* — Christopher Schwartz
(74) *Attorney, Agent, or Firm* — Westerman, Hattori, Daniels & Adrian, LLP (57) ABSTRACT

A first hydraulic fluid passage includes an annular fluid passage, an inlet hole and a notch of a magnetic passage forming ring, another notch and a communication hole of a non-magnetic passage forming ring, an outlet hole and a discharge hole of a valve plate, another discharge hole of a valve plate retainer, and a first fluid passage of a one-way valve retainer. On the other hand, a second hydraulic fluid passage includes a second fluid passage of the one-way valve retainer, and the annular fluid passage.

12 Claims, 10 Drawing Sheets

VARIABLE DAMPING FORCE DAMPER

CROSS REFERENCES TO RELATED APPLICATIONS

The present application claims priority under 35 U.S.C. §119 to Japanese Patent Application No. 2012-031006, filed Feb. 15, 2012, entitled "Variable Damping Force Damper." The contents of this application are incorporated herein by reference in their entirety.

TECHNICAL FIELD

The present disclosure relates to a solenoid-controlled variable damping-force damper which is used in the suspension of an automobile or the like, and particularly to a suspension damping technology for preventing a valve plate from being excessively open at high-speed operation of the damper without causing reduction in damping force control performance.

BACKGROUND

Suspension is an essential factor which affects the driving stability of a vehicle, and its main components includes a link (an arm and a rod) configured to vertically movably support the wheels for a vehicle body, a spring configured to absorb an impact from a road surface by bending, and a damper configured to damp the oscillation of the spring. A damper for vehicle suspension includes a cylindrical-shaped cylinder filled with hydraulic fluid, a piston configured to slide in the cylinder in its axis direction, and a piston rod having an end to which the piston is attached. A typical damper has a double or single cylinder structure in which hydraulic fluid is moved between a plurality of fluid chambers along with the operation of the piston.

In a cylindrical damper, a piston is provided with a disc valve which is flexible and has a communicating fluid passage. In general, damping force is obtained by applying a flow resistance by the disc valve to the hydraulic fluid which is moved between the fluid chambers via the communicating fluid passage. However, such a damper has fixed damping characteristics, and thus it is not possible to obtain ride comfort and driving stability corresponding to a road surface state and driving conditions. Thus, a variable damping-force damper has been proposed in which valve plates composed of a magnetic material on the contraction and extension sides are installed on the upper and lower surfaces of the piston body, a circular magnetic coil to generate a magnetic field is interposed between an outer yoke and an inner yoke which constitute the piston body, and the strength of the magnetic field changes with an increase or decrease of the amount of current through the magnetic coil, thereby continuously changing the valve opening characteristics (i.e., damping force) of the valve plates (see Japanese Patent No. 4599422 and Japanese Patent No. 4825723).

SUMMARY

According to study, the followings are found. In the variable damping-force damper disclosed in Japanese Patent No. 4599422 and Japanese Patent No. 4825723, the power consumption of the damper may significantly increase at high-speed operation due to electromagnetic attraction of a valve plate at an end surface of the piston body. That is to say, in the damper with the above-described structure, a large amount of hydraulic fluid passes through the communicating fluid passage at high-speed telescopic operation, and the hydraulic pressure on the communicating fluid passage (inner) side increases due to a sudden inflow of the hydraulic fluid, while the hydraulic pressure on the fluid chamber (outer) side decreases due to a move of the piston in a moving-away direction, and thus the valve plate is opened excessively. When the degree of the opening of the valve plate increases (the valve plate moves away from the end surface of the piston body by a certain distance) in this manner, a large amount of current needs to be supplied to the magnet coil in order to obtain a target damping force because the magnitude of the electromagnetic attraction force generated by a magnetic coil is inversely proportional to the square of the distance between the piston body (an outer yoke and an inner yoke) and the valve plate. Consequently, the fuel consumption is inevitably increased due to further discharge of the battery mounted in the vehicle and an increase in the power generation load of an alternator.

Thus, the inventors tried to reduce the power consumption for control and ensure the damping force at the time of a power fault by urging the valve plate toward the piston body side with a spring and increasing the valve opening pressure of the valve plate in a state where power is not supplied to the magnetic coil. However, when the above approach is used, the force of a coil spring is constantly applied to the valve plate, and thus the control performance of the magnetic coil over the damping force is inevitably reduced. For example, with a structure in which the valve plate to be attracted by the magnetic coil is provided only on the extension side, and a normal disc valve (one-way valve) is provided on the contraction side, the hydraulic fluid passage on the contraction side is required to be disposed inside the magnetic coil, and thus it is difficult to ensure a sufficient distribution area of the hydraulic fluid on the contraction side.

The present disclosure has been made in view of such a background and study, and it is an object of the disclosure to provide a solenoid-controlled variable damping-force damper which prevents a valve plate from being excessively open at high-speed operation of the damper without causing reduction in damping force control performance.

A variable damping-force damper according to the present embodiment is a variable damping-force damper for controlling a damping force by supplying a current to the magnetic coil, the damping force being generated when a hydraulic fluid passes from the first fluid chamber to the second fluid chamber, the variable damping-force damper including: a cylinder in which a hydraulic fluid is sealed; a piston which is reciprocatably disposed in the cylinder and configured to partition the cylinder into a first fluid chamber and a second fluid chamber; a sliding contact portion which is formed in the piston and configured to come into sliding contact with an inner circumferential surface of the cylinder; and a piston rod having an end to which the piston is secured. The piston having an inner yoke composed of a magnetic material, a magnetic coil disposed along an outer circumference of the inner yoke, an outer yoke composed of a magnetic material which surrounds the magnetic coil, a valve plate composed of a magnetic material, which is pressed to and brought into contact with a valve seat and configured to form an opening between the valve seat and the valve plate at a time of valve opening operation, the valve seat being formed integrally with the inner yoke or the outer yoke, a valve holder configured to support the valve plate and the sliding contact portion is disposed in an outer circumference of the valve holder, and an annular fluid passage which is formed between an outer circumference of the outer yoke and the inner circumference of the cylinder, and is partitioned from the second fluid chamber by the sliding contact portion. A first hydraulic fluid passage and a second hydraulic fluid passage are separately provided. The first hydraulic fluid passage extends from the first fluid chamber to the second fluid chamber through the annular fluid passage, an inlet hole which is formed at the outer circumference of the outer yoke, the opening formed between the valve seat and the valve plate, and a first fluid passage formed in the valve holder. The second hydraulic fluid passage is provided with a first one-way valve configured to pass a hydraulic fluid from the second fluid chamber to the annular fluid passage only and extends to the first fluid chamber through a second fluid passage formed in the valve holder and the annular fluid passage. According to the variable damping-force damper in the present embodiment, the first hydraulic fluid passage and the second hydraulic fluid passage are separately disposed, and thus by appropriately setting the flow passage area and geometry of the first fluid passage, excessive opening of the valve plate can be prevented without increasing the valve opening pressure, and the control performance over the damping force can be improved. In addition, according to the variable damping-force damper in the present embodiment, the annular fluid passage is formed outside the magnetic coil and the outer yoke, and thus a sufficient distribution area of hydraulic fluid in the second hydraulic fluid passage can be ensured. For example, a smooth operation is achieved during the contraction operation.

A second aspect of the present embodiment is the variable damping-force damper, and the piston has a pressure-maintaining chamber on the second fluid chamber side of the valve plate. Thus, at the time of valve opening, the hydraulic pressure on the annular fluid passage side in the valve plate and the hydraulic pressure on the pressure-maintaining chamber side in the valve plate are balanced, thereby being able to prevent excessive opening of the valve plate more effectively.

A third aspect of the present embodiment is the variable damping-force damper further including a passage forming member composed of a non-magnetic material, the passage forming member being provided between a distal end of the inner yoke and a distal end of the outer yoke, and a sealing unit configured to prevent entry of hydraulic fluid into the magnetic coil is provided between the passage forming member and the magnetic coil. Thus, an operation failure or the like of the magnetic coil caused by entry of hydraulic fluid can be prevented.

A fourth aspect of the present embodiment is the variable damping-force damper, and in the outer yoke and the passage forming member, there is formed a rotation controller configured to control relative rotation of the outer yoke with respect to the passage forming member. Thus positioning at the time of assembly can be easily performed, and positional displacement after long-term use can be reliably prevented.

A fifth aspect of the present embodiment is the variable damping-force damper, and an extending portion which projects radially inwardly of the piston is formed at an end of the outer yoke, closer to the valve plate. Thus, the amount of magnetic flux which acts on the valve plate increases, and current consumption of the magnetic coil can be reduced.

A sixth aspect of the present embodiment is the variable damping-force damper, and a discharge hole which constitutes part of the first hydraulic fluid passage is formed at a base of the valve plate. Thus, the damping characteristics can be easily changed by using a valve plate having a discharge hole with a different flow passage area.

A seventh aspect of the present embodiment is the variable damping-force damper, and the first hydraulic fluid passage is provided with a second one-way valve configured to pass a hydraulic fluid from the first fluid chamber to the second fluid chamber only. Thus, a valve plate having a lower backflow check function (that is to say, a flexible valve plate having a lower valve opening pressure) can be used, and the control performance over the damping force can be improved.

An eighth aspect of the present embodiment is the variable damping-force damper, and the valve holder is divided into a valve plate retainer and a one-way valve retainer, the valve plate retainer being configured to support the valve plate, the one-way valve retainer being configured to hold the first one-way valve and the second one-way valve, and a piston ring constituting the sliding contact portion being provided on an outer circumference of the one-way valve retainer. Thus, mechanical damping performance can be easily controlled by changing or adjusting one-way valve retainer (i.e., the first one-way valve and the second one-way valve), and thus the variable damping-force damper may be applied to a variety of vehicles, while the main components thereof are shared.

BRIEF DESCRIPTION OF THE DRAWINGS

The advantages of the disclosure will become apparent in the following description taken in conjunction with the following drawings.

DETAILED DESCRIPTION

Figure 2:
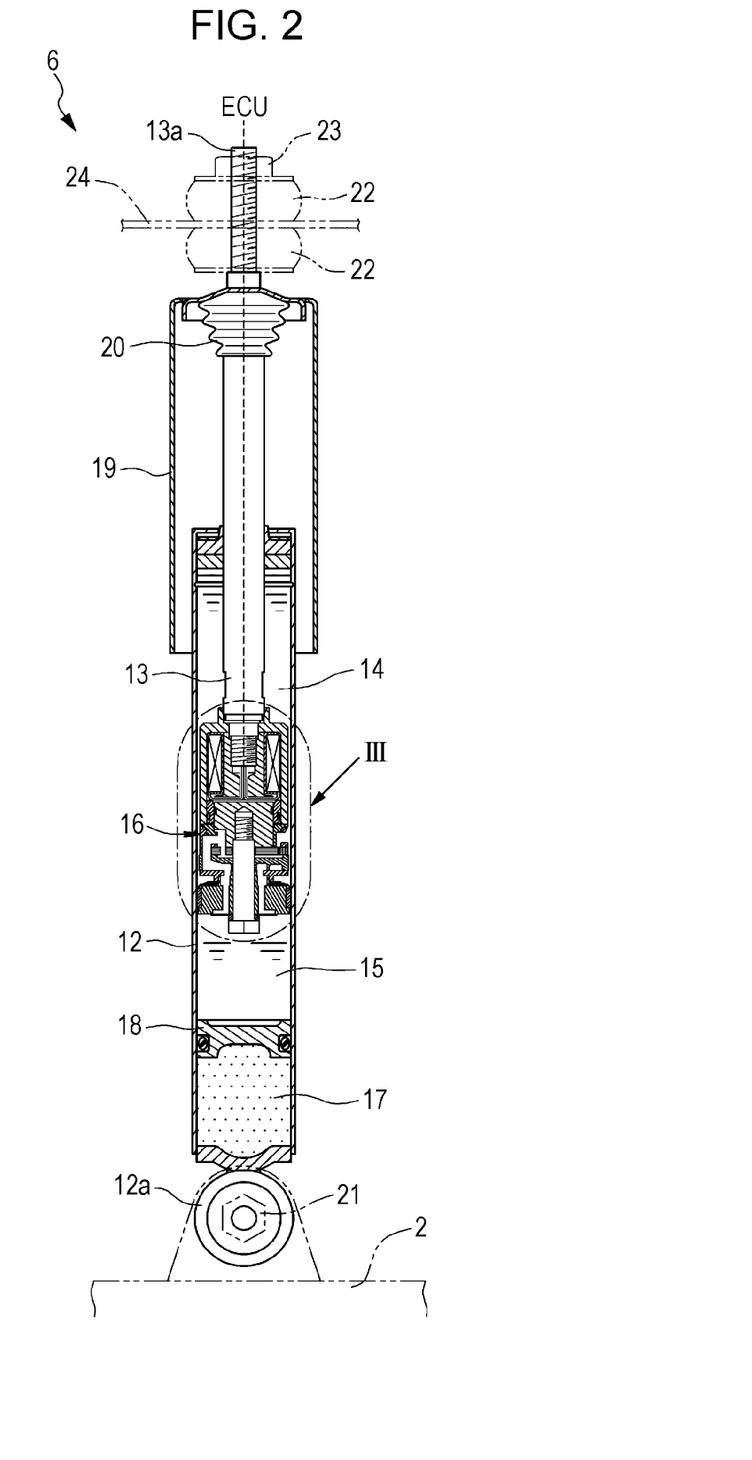
FIG. 2 is a vertical cross-sectional view of a variable damping-force damper according to the embodiment.

Hereinafter, an embodiment in which the present disclosure is applied to a single cylinder variable damping-force damper which constitutes a part of the rear suspension of a vehicle will be described in detail with reference to the accompanying drawings. It is apparent that the present disclosure may be applied to a double-cylinder structure. It should be noted that the members and positional relationship thereof in the embodiment are described under the assumption that the upper direction in FIG. 2 is "up."

Configuration of Embodiment

<Suspension>

Figure 1:
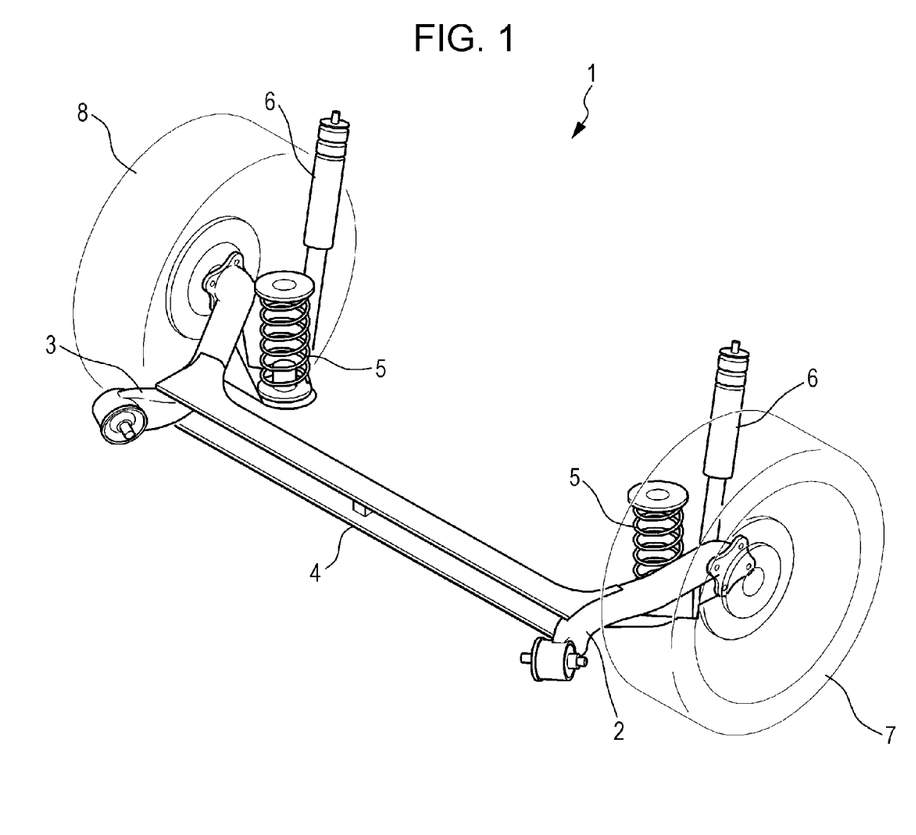
FIG. 1 is a perspective view of a rear suspension for a vehicle according to an embodiment.

As illustrated in FIG. 1, the rear suspension 1 in the present embodiment is so-called H-type torsion beam suspension, and includes left and right trailing arms 2, 3, a torsion beam 4 which connects between both trailing arms 2, 3, a pair of left and right coil springs 5 which are suspension springs, and a pair of left and right dampers 6. The rear suspension 1 suspends left and right rear wheels 7, 8. The dampers 6 are each an electromagnetic control variable damping-force damper, and the damping force is variably controlled by an ECU (not illustrated) installed in a trunk compartment or the like.

<Damper>

As illustrated in FIG. 2, a damper 6 in the present embodiment is a mono-tube (De Carbon) damper, and mainly includes a cylindrical-shaped cylinder 12 filled with MRF, a piston rod 13 configured to slide relative to the cylinder 12 in the axis direction, a piston 16 which is attached at one end of the piston rod 13 and is configured to partition the cylinder 12 into a rod-side fluid chamber (a first fluid chamber) and a piston-side fluid chamber 15 (a second fluid chamber), a free piston 18 configured to define a high pressure gas chamber 17 below the cylinder 12, a cover 19 configured to prevent dust from adhering to the piston rod 13, and a bump stop 20 configured to perform buffering at the time of full bound.

The cylinder 12 is connected to the upper surface of the trailing arm 2, which is a member of the wheels, via a bolt 21 fitted into an eyepiece 12a at the lower end of the cylinder 12. An upper-end screw shaft 13a of the piston rod 13 is connected to a damper base (upper part of the wheel house) 24, which is a member of the vehicle body, via a vertical pair of bush 22 and nut 23.

<Piston>

Figure 3:
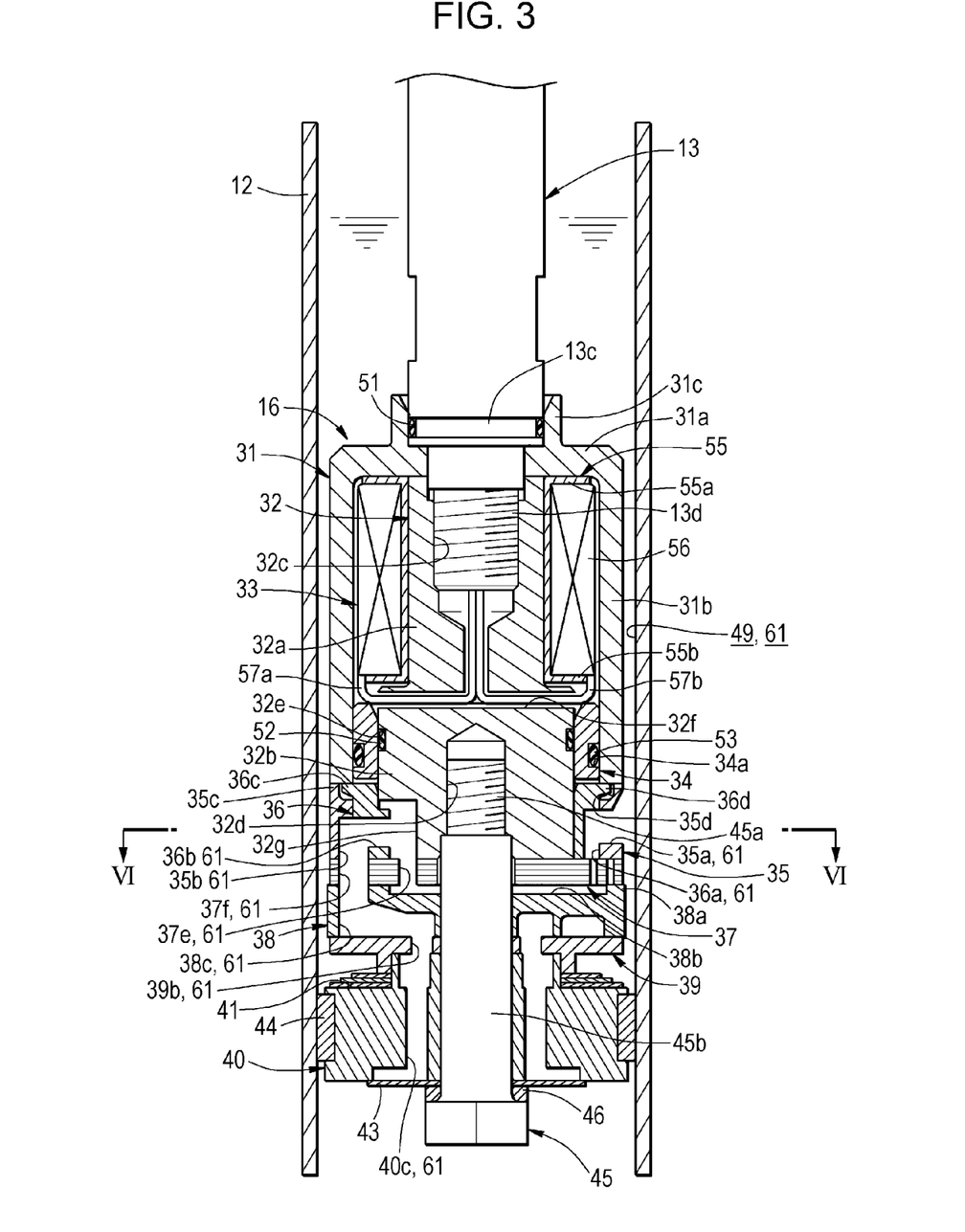
FIG. 3 is an enlarged view of section III in FIG. 2.
Figure 4:
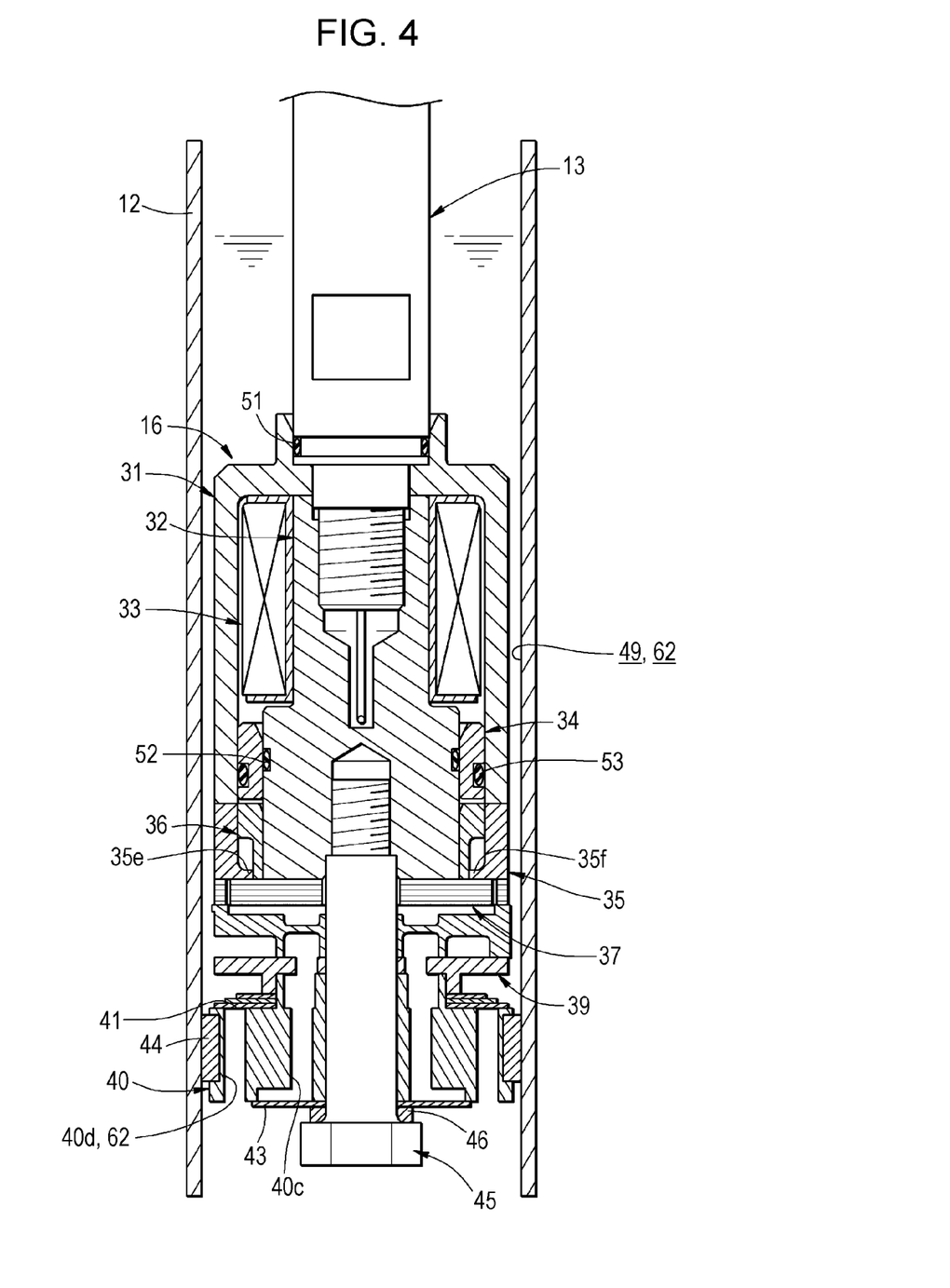
FIG. 4 is a vertical cross-sectional view of a piston taken along a plane with an angle 90° different from that in FIG. 3.
Figure 5:
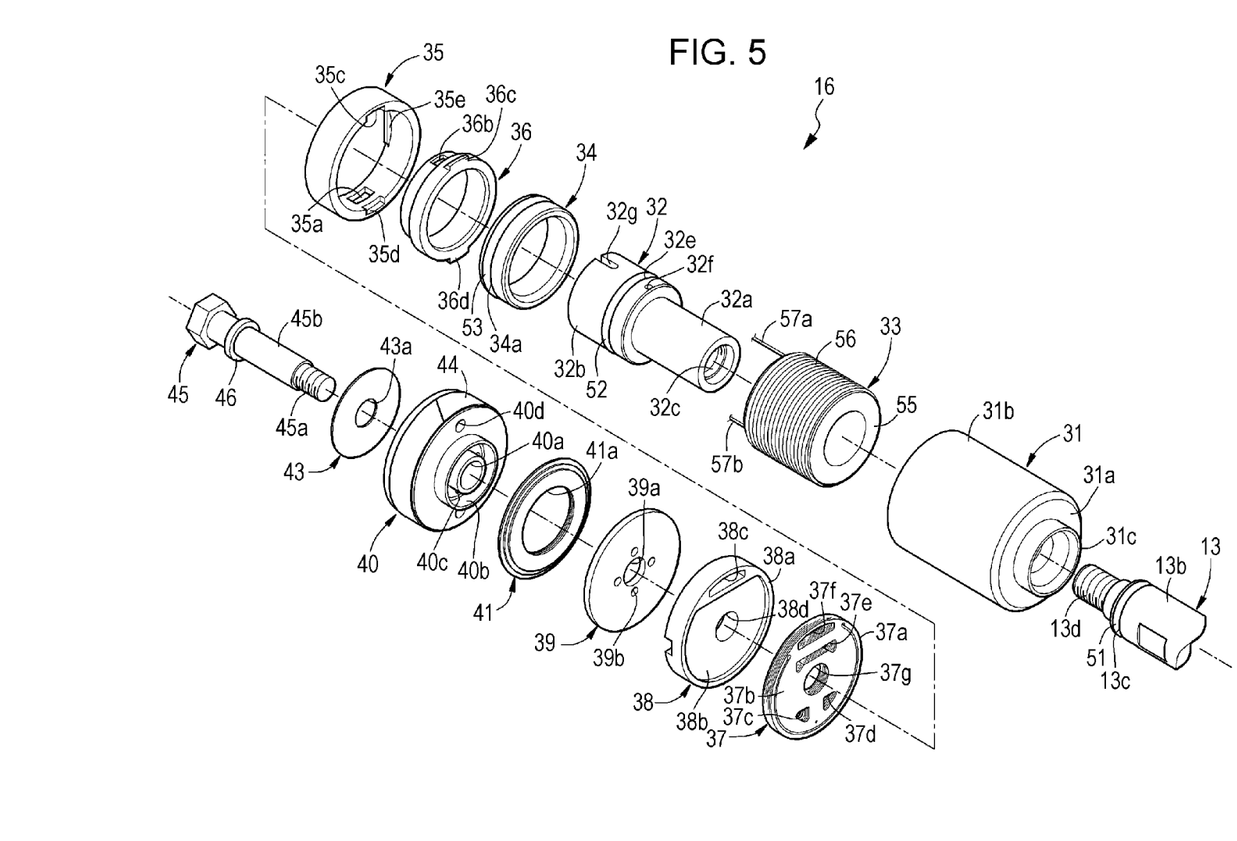
FIG. 5 is an exploded perspective view of a piston according to the embodiment.

As illustrated in FIGS. 3 to 5, the piston 16 includes an outer yoke 31, an inner yoke 32, a magnetic coil 33, a seal ring 34, a magnetic passage forming ring 35 (outer yoke), a non-magnetic passage forming ring 36, a valve plate 37, a valve plate retainer 38, a spacer ring 39, a one-way valve retainer 40, a contraction-side damping valve 41, an extension-side one-way valve 43, a piston ring 44, a hexagon bolt (hereinafter simply referred to as a bolt) 45, and a collar 46. Because the piston 16 is assembled by stacking the components 31 to 46 in the axis direction in the present embodiment, the man-hours and costs needed for manufacturing the damper 6 are reduced.

The outer yoke 31, the inner yoke 32, and the magnetic passage forming ring 35 are manufactured by the powder metallurgy process, the die casting process or the like using a ferromagnetic substance such as Ferrite as a material. In addition, the seal ring 34, the non-magnetic passage forming ring 36, the valve plate retainer 38, the spacer ring 39, and the one-way valve retainer 40 are manufactured by the cutting process, the casting process, or the like using a non-magnetic substance such as stainless steel as a material.

The outer yoke 31 includes a top-cover portion 31a into which the lower end of the piston rod 13 is inserted, and a cylindrical portion 31b. In the middle of the upper surface of the top-cover portion 31a, there is vertically provided a holding cylindrical portion 31c into which the lower end of a shank 13b of the piston rod 13 is inserted. An annular groove 13c is formed along the lower outer circumference of the shank 13b of the piston rod 13, and an O ring 51 (oil seal) configured to seal between the piston rod 13 and the holding cylindrical portion 31c of the outer yoke 31 is held in the annular groove 13c. The outer diameter of the outer yoke 31 is set to be smaller than the inner diameter of the cylinder 12, and the space between the cylinder 12 and the outer yoke 31 forms an annular fluid passage 49.

The inner yoke 32 has a cylindrical shape with a step, and includes a smaller diameter portion 32a to which the magnetic coil 33 is outwardly fitted, and a larger diameter portion 32b to which the seal ring 34 is outwardly fitted. In the axial center of the smaller diameter portion 32a, there is formed an upper screw hole 32c into which a lower end screw shaft 13d of the piston rod 13 is screwed, and in the axial center of the larger diameter portion 32b, there is formed a lower screw hole 32d into which a thread part 45a of the bolt 45 is screwed. Furthermore, an annular groove 32e is formed along the upper outer circumference of the larger diameter portion 32b, and an O ring 52 (oil seal) configured to seal between the larger diameter portion 32b and the seal ring 34 is held in the annular groove 32e. As illustrated in FIG. 3, a through hole 32f passing the axial center is formed horizontally right above the annular groove 32e, and (the below-described) lead wires 57a, 57b of the magnetic coil 33 are wired from the through hole 32f to a lead wire insertion hole (not illustrated) which is formed in the axial center of the piston rod 13. As illustrated in FIG. 3, at the lower end of the larger diameter portion 32b, there is formed a notch 32g which constitutes part of a first hydraulic fluid passage 61 described below.

As illustrated in FIG. 3, the magnetic coil 33 is obtained by winding a lead wire 56 within a bobbin 55 having outward flanges 55a, 55b at the upper and lower ends, and the bobbin 55 is outwardly fitted to the outer circumference of the smaller diameter portion 32a of the inner yoke 32. The magnetic coil 33 is provided with a pair of lead wires 57a, 57b for supplying a current to the lead wire 56.

The seal ring 34 has a cylindrical shape fitted between the lower inner circumferential surface of the cylindrical portion 31b of the outer yoke 31, and the upper outer circumferential surface of the larger diameter portion 32b of the inner yoke 32. Annular groove 34a is formed along the outer circumference of the seal ring 34, and an O ring 53 (oil seal) configured to seal between the seal ring 34 and the outer yoke 31 is held in the annular groove 34a.

Figure 6:
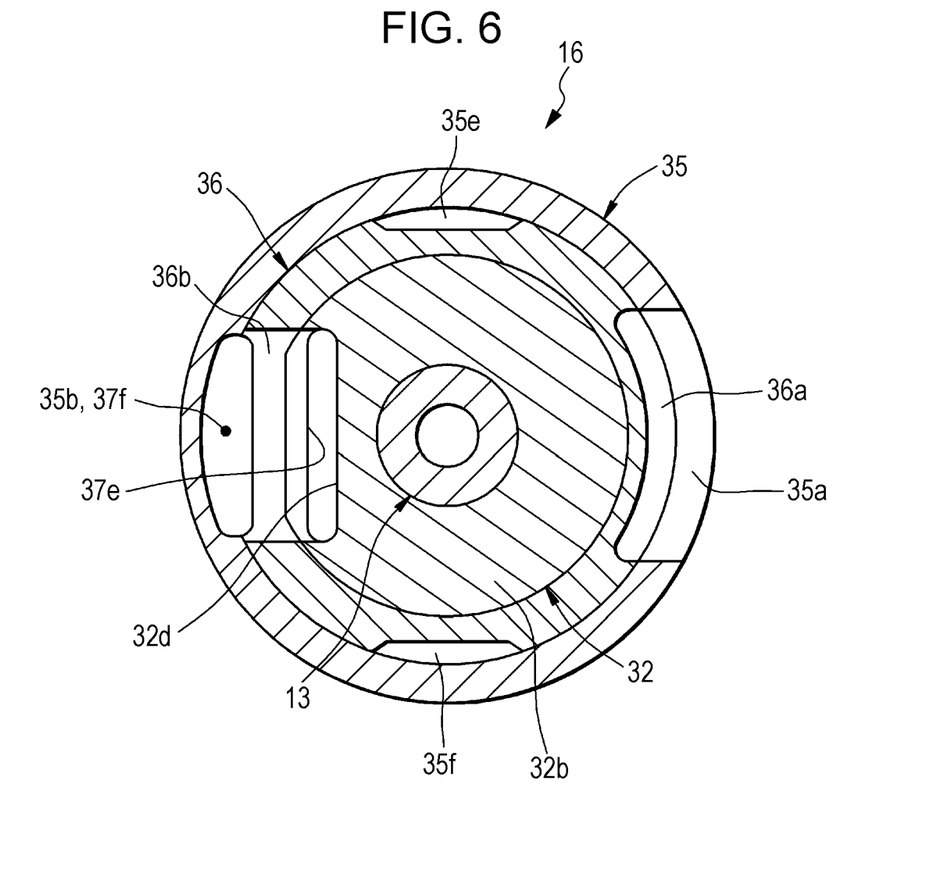
FIG. 6 is an enlarged cross-sectional view taken along a line VI-VI in FIG. 3.

The magnetic passage forming ring 35 constitutes the lower portion of the outer yoke 31, and has a cylindrical shape with inner and outer diameters substantially equal to those of the cylindrical portion 31b of the outer yoke 31. As illustrated in FIG. 3, the magnetic passage forming ring 35 has an inlet hole 35a and a notch 35b which constitute part of the first hydraulic fluid passage 61 described below. As illustrated in FIGS. 3 and 5, at the upper end of the magnetic passage forming ring 35, a pair of positioning recesses 35c, 35d are formed with an angle interval of 180°. On the other hand, as illustrated in FIGS. 4 and 6, the lower end inner circumference of the magnetic passage forming ring 35 is provided with a pair of extending portions 35e, 35f which project inwardly. The outer diameter of the magnetic passage forming ring 35 is set to be smaller than the inner diameter of the cylinder 12, and the space between the cylinder 12 and the magnetic passage forming ring 35 forms a part of the annular fluid passage 49.

The non-magnetic passage forming ring 36 has a cylindrical shape fitted between the outer circumferential surface of the larger diameter portion 32b of the inner yoke 32, and the inner circumferential surface of the magnetic passage forming ring 35. As illustrated in FIG. 3, the non-magnetic passage forming ring 36 has a notch 36a and a communication hole 36b which constitute part of the first hydraulic fluid passage 61, and is arranged substantially integrally with the inner yoke 32 and the outer yoke 31. As illustrated in FIGS. 3 and 5, a pair of positioning projections 36c, 36d to be respectively inserted into the positioning recesses 35c, 35d of the magnetic passage forming ring 35 project outwardly from the upper end of the non-magnetic passage forming ring 36. Accordingly, positioning of the magnetic passage forming ring 35 and the non-magnetic passage forming ring 36 in the rotational direction can be easily and reliably performed, and positional displacement after long-term use can be reliably prevented.

The valve plate 37 is a layer obtained by stacking a plurality of flexible steel sheets (six sheets in the illustrated example) composed of a magnetic material. As illustrated also in FIGS.

Figure 7:
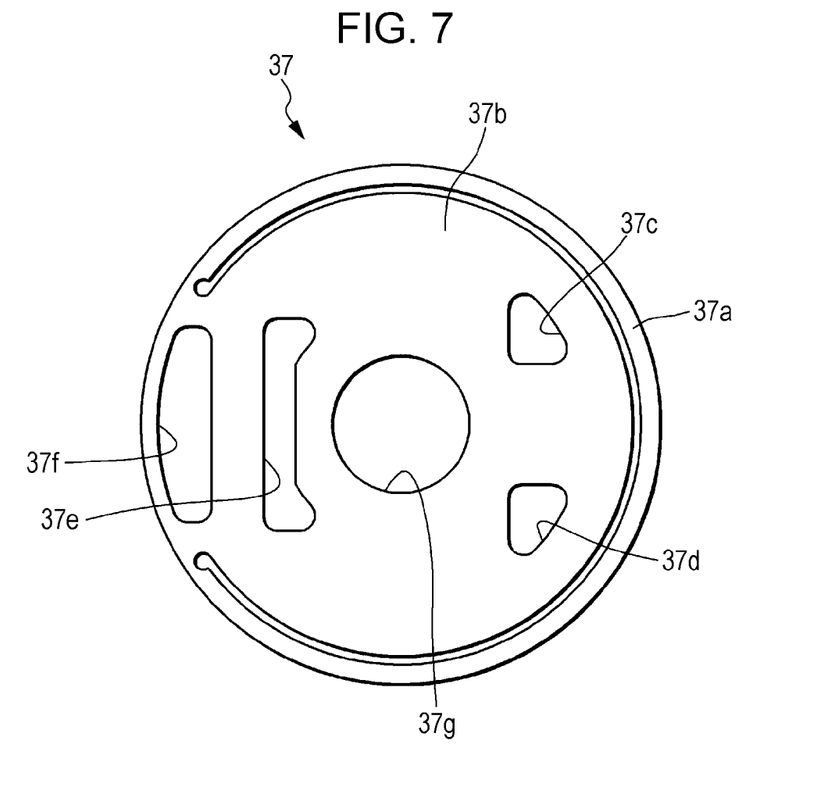
FIG. 7 is a plan view of a valve plate.

5 and 7, the valve plate 37 includes a circular valve base portion 37a which is supported by the magnetic passage forming ring 35 and the valve plate retainer 38, and a disc-shaped valve body portion 37b which is disposed inside the valve base portion 37a. The base end of the valve body portion 37b is connected to the valve base portion 37a, and opens below when being urged by the hydraulic fluid which flows from the annular fluid passage 49. A pair of communication holes 37c, 37d, and an outlet hole 37e are formed in the valve body portion 37b. In the valve base portion 37a, a discharge hole 37f is formed in the base end of the valve body portion 37b. A bolt hole 37g into which the shank 45b of the bolt 45 is inserted (see FIGS. 5 and 7) is formed at the center of the valve body portion 37b.

The valve plate retainer 38 has a disc shape in which a retainer portion 38a formed on the upper outer circumference of the valve plate retainer 38 is pressed and brought into contact with the valve base portion 37a of the valve plate 37. Inside the retainer part 38a, there is formed a pressure-maintaining recess 38b into which opened valve body portion 37b is fitted. In addition, in the valve plate retainer 38, there are formed a discharge hole 38c and a bolt hole 38d into which the shank 45b of the bolt 45 is inserted (see FIG. 5), the discharge hole 38c being opened at a position corresponding to the discharge hole 37f of the valve plate 37, and allowing the hydraulic fluid to pass toward the axial center side. The outer diameter of the valve plate retainer 38 is set to be smaller than the inner diameter of the cylinder 12, and the space between the cylinder 12 and the valve plate retainer 38 forms a part of the annular fluid passage 49.

The spacer ring 39 has a disc shape, at the center of which a bolt hole 39a allowing the shank 45b of the bolt 45 to be inserted through (see FIG. 5) is formed. The spacer ring 39 has four through holes 39b around the bolt hole 39a, the through holes 39b being communicated with the discharge hole 37f of the valve plate 37.

The one-way valve retainer 40 has a disc shape with an outer circumference to be fitted to a piston ring 44, and at the center of the upper surface of the disc shape, there is vertically provided a holding cylindrical portion 40a into which the shank 45b of the bolt 45 is inserted. Outside the holding cylindrical portion 40a, there is vertically provided an annular cross-sectional partition cylindrical portion 40b which is in contact with the lower surface of the spacer ring 39. Four vertically penetrating first oil passages 40c constituting part of the first hydraulic fluid passage 61 are formed between the holding cylindrical portion 40a and the partition cylindrical portion 40b with an angle interval of 90°. Outside the partition cylindrical portion 40b, two second fluid passages 40d constituting part of a second hydraulic fluid passage 62 are formed with an angle interval of 90°. The one-way valve retainer 40 and the spacer ring 39 support the center area of the contraction-side damping valve 41.

The contraction-side damping valve 41 is a layer obtained by stacking annular shapes, each of which is stamped from a plate having elasticity. The contraction-side damping valve 41 has a central hole 41a externally fitted to the partition cylindrical portion 40b of the one-way valve retainer 40 (see FIG. 5), and closes the second fluid passages 40d at the time of its valve closing operation. The contraction-side damping valve 41 closes with a predetermined spring force (valve opening reaction), and the damping performance for the contraction operation is determined by the spring force of the contraction-side damping valve 41.

The extension-side one-way valve 43 is also an annular-shaped object stamped from a plate having elasticity, and has a central hole 43a into which the shank 45b of the bolt 45 is inserted (see FIG. 5). The extension-side one-way valve 43 is fastened to the lower end of the one-way valve retainer 40 via the bolt 45 and the collar 46, and closes a first fluid passage 40c at the time of its valve closing operation.

The collar 46 is externally fitted to the shank 45b of the bolt 45, and supports the extension-side one-way valve 43 together with the lower surface of the one-way valve retainer 40.

<First Hydraulic Fluid Passage>

As illustrated in FIG. 3, the first hydraulic fluid passage 61 includes the annular fluid passage 49, the inlet hole 35a of the magnetic passage forming ring 35, the notch 36a of the non-magnetic passage forming ring 36, the notch 35b of the magnetic passage forming ring 35, the communication hole 36b of the non-magnetic passage forming ring 36, the outlet hole 37e and the discharge hole 37f of the valve plate 37, the discharge hole 38c of the valve plate retainer 38, and the first fluid passage 40c of the one-way valve retainer 40.

<Second Hydraulic Fluid Passage>

On the other hand, as illustrated in FIG. 4, the second hydraulic fluid passage 62 includes the second fluid passage 40d of the one-way valve retainer 40, and the annular fluid passages 49.

Effect of Embodiment

When a vehicle starts to move, the ECU sets a target damping force of the damper 6 based on the acceleration of the vehicle body, obtained from a fore-and-aft G sensor, a horizontal G sensor, and a vertical G sensor, the vehicle body speed inputted from a speed sensor, and the rotational speeds of the wheels obtained from a wheel speed sensor, and supplies a driving current (excitation current) to the magnetic coil 33. The magnetic coil 33 then generates a magnetic flux which passes through the outer yoke 31, the inner yoke 32, and the magnetic passage forming ring 35 so that the valve plate 37 is magnetically attracted to the side of the inner yoke 32 and the magnetic passage forming ring 35. In the above process, the amount of magnetic flux which acts on the valve plate 37 increases because the lower end inner circumference of the magnetic passage forming ring 35 is provided with a pair of extending portions 35e, 35f, and thus damping force control for the extension operation can be performed with relatively small power.

<In Extension Operation>

Figure 8:
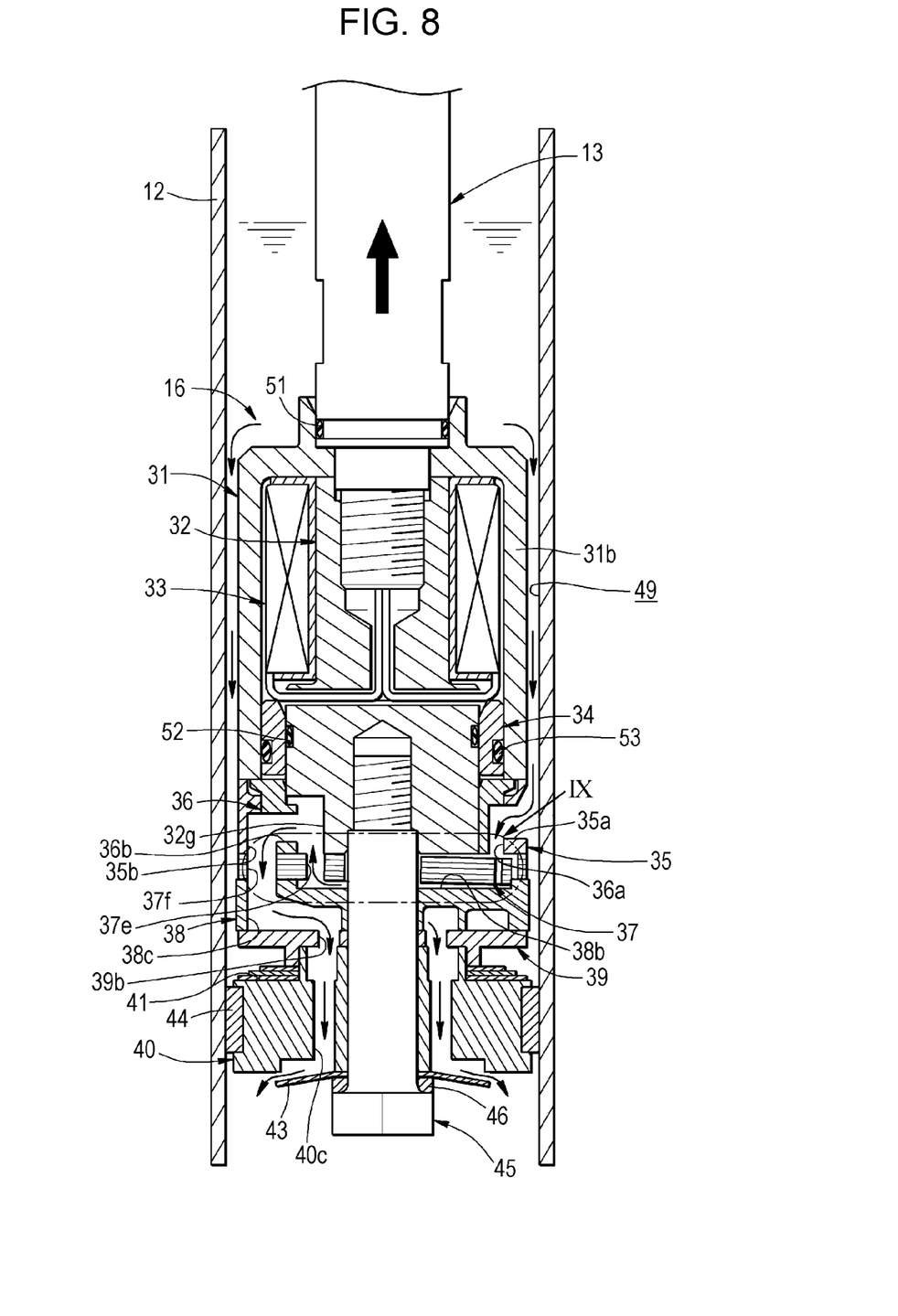
FIG. 8 is an enlarged cross-sectional view of the principal portion of a damper according to the embodiment at the time of operation of the extension.

When the damper 6 performs telescopic operation on the extension side, the piston 16 moves upward in the cylinder 12 with a predetermined speed as illustrated in FIG. 8. Then, the hydraulic fluid in the rod-side fluid chamber 14 flows from the outer circumference of the outer yoke 31 into the annular fluid passage 49 of the first hydraulic fluid passage 61, then passes through the inlet hole 35a of the magnetic passage forming ring 35 and the notch 36a of the non-magnetic passage forming ring 36, and collides with the upper surface of the valve plate 37, thereby opening (pushing and opening) the valve body portion 37b of the valve plate 37. Thus the hydraulic fluid flows into the pressure-maintaining recess 38b. In the above process, with the hydraulic fluid flowing through the communication holes 37c, 37d, the hydraulic pressure of the upper surface of the valve body portion 37b (the surface, close to the notch 36a, of the non-magnetic passage forming ring 36) and the hydraulic pressure of the lower surface thereof are substantially the same in the pressure-maintaining recess 38b. Thus, even when the damper 6 operates at a high speed on the extension side, and the flowing speed of the hydraulic fluid in the first hydraulic fluid passage 61 increases, excessive valve opening of the valve body portion 37b is not likely to occur. Accordingly, the ECU does not need to supply a needlessly large current to the magnetic coil 33, and a target current can be set at substantially the same level regardless of the operation speed of the damper 6, and thus the controllability of the damping force is also improved.

Figure 9:
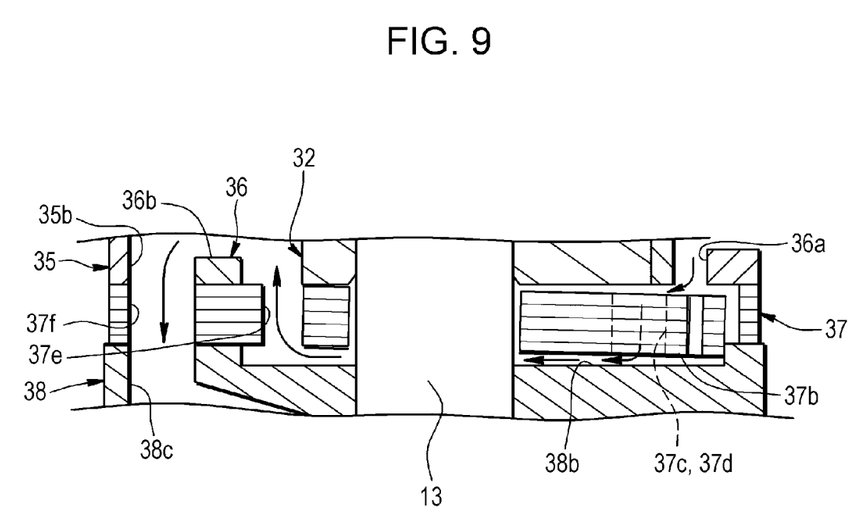
FIG. 9 is an enlarged view of section IX in FIG. 8.

As illustrated in FIG. 9, the hydraulic fluid which has flown into the pressure-maintaining recess 38b passes through the outlet hole 37e of the valve plate 37, the communication hole 36b of the non-magnetic passage forming ring 36, the notch 35b of the magnetic passage forming ring 35, the discharge hole 37f of the valve plate 37, and the discharge hole 38c of the valve plate retainer 38. Then the hydraulic fluid flows into the first fluid passage 40c of the one-way valve retainer 40 to open (push and open) the extension-side one-way valve 43, and flows into the piston-side fluid chamber 15.

In this manner, the hydraulic fluid passes through not only the valve plate 37, but also the extension-side one-way valve 43 at the time of extension operation. Therefore, the valve plate 37 seldom need to have the function as a one-way valve, and thus the valve body portion 37b having an extremely low valve opening pressure (that is to say, having flexibility) is used so as to be able to improve the controllability of the damping force.

In the case of the present embodiment, the damping characteristics for the extension operation can be easily changed by using the valve plate 37 having the discharge hole 37f with a different flow passage area. Because the valve plate retainer 38 and the one-way valve retainer 40 constitute the valve holder, only the one-way valve retainer 40 may be replaced and other components are shared, while the damping characteristics for the extension operation and the contraction operation can be set freely.

<In Contraction Operation>

Figure 10:
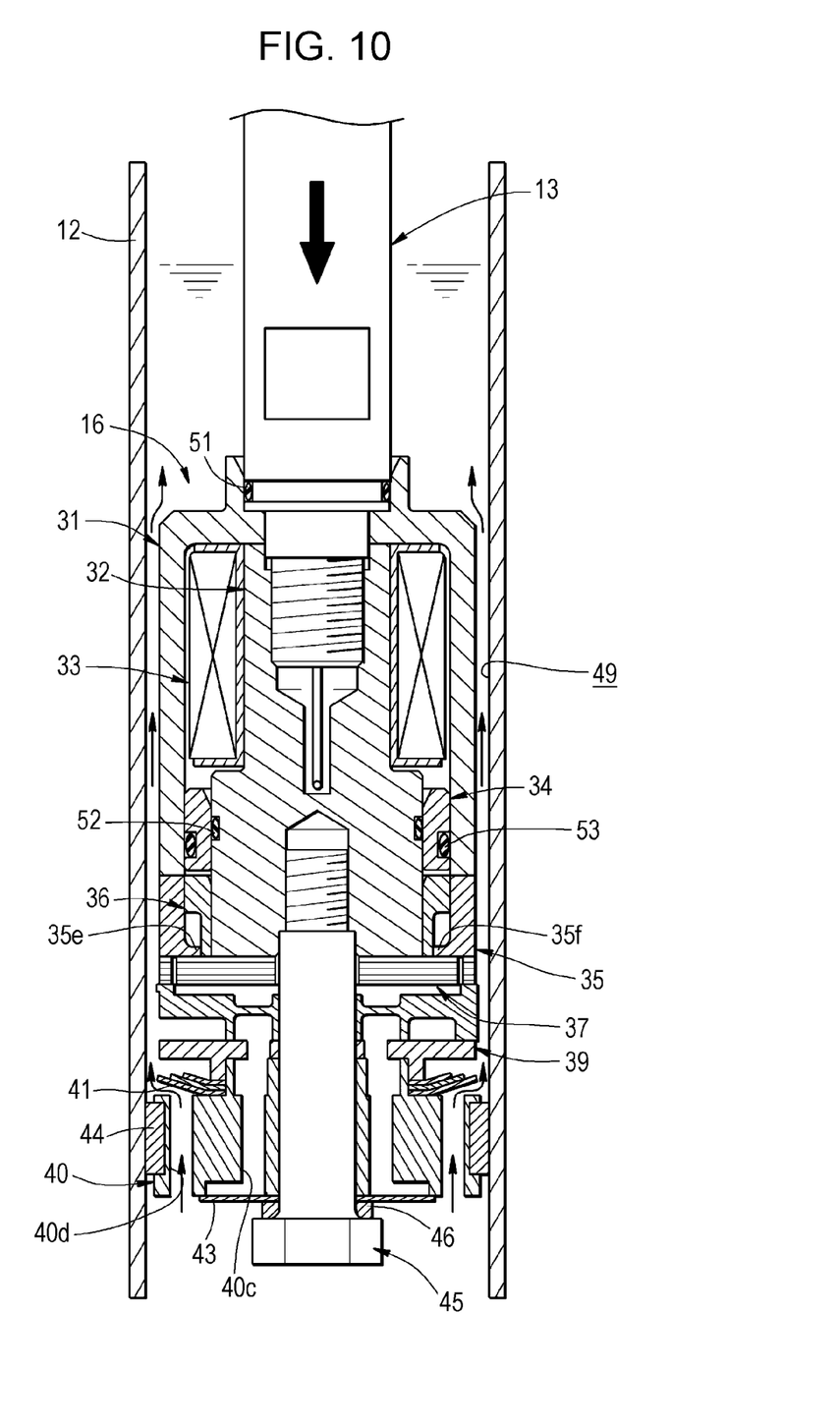
FIG. 10 is an enlarged cross-sectional view of the principal portion illustrating the effect of the damper according to the embodiment at the time of operation of the contraction.

When the damper 6 performs telescopic operation on the contraction side, the piston 16 moves downward in the cylinder 12 with a predetermined speed as illustrated in FIG. 10, and the hydraulic fluid in the piston-side fluid chamber 15 flows into the second fluid passage 40d of the one-way valve retainer 40. The hydraulic fluid which has flown into the second fluid passage 40d opens (pushes and opens) the contraction-side damping valve 41 against the spring force. The hydraulic fluid which has opened the contraction-side damping valve 41 passes through the annular fluid passage 49, then flows into the rod-side fluid chamber 14. Because the lower end of the one-way valve retainer 40 is provided with the extension-side one-way valve 43, the hydraulic fluid does not flow into the valve plate 37 side via the first fluid passage 40c (i.e., the first hydraulic fluid passage 61) at the time of contraction operation.

In the present embodiment, the annular fluid passage 49 is formed between the outer yoke 31 and the cylinder 12 (i.e., outside the magnetic coil 33), and thus a relatively large flow passage area of the second hydraulic fluid passage 62 is ensured and contraction operation is performed smoothly. Because entry of hydraulic fluid to the magnetic coil 33 is prevented by the O rings 51 to 53 which are mounted on the outer yoke 31, the inner yoke 32, and the seal ring 34, an operation failure due to deterioration or the like of the covering material for the lead wire 56 is not likely to occur.

Although no further description of the embodiment will be given, the aspects of the present disclosure are not limited to those stated above. In the above-described embodiment, the present disclosure is applied to a variable damping-force damper used for, for example, a torsion beam suspension, however, the present disclosure may be naturally applied to a variable damping-force damper for MacPherson strut suspension or double wishbone suspension, a variable damping-force damper for front suspension, and a variable damping-force damper in a double cylinder structure. In the above-described embodiment, only the extension side is provided with a damping force variable mechanism, however, the contraction side may also be provided with a damping force variable mechanism. In the above-described embodiment, the piston ring is used as a sliding contact portion, however the outer circumferential surface of the valve plate retainer or the one-way valve retainer may come into direct sliding contact with the inner circumferential surface of the cylinder. In addition, specific configuration and installation location of each one-way valve and the damping force variable mechanism are not limited to the aspects of the above-described embodiment, and may be changed freely according to convenience in manufacturing or designing. In addition, specific configuration of the damper and specific geometry of each member may be changed as needed within the scope without departing from the spirit of the present disclosure.

I claim:

1. A variable damping-force damper comprising:
a cylinder including a hydraulic fluid sealed therein;
a piston reciprocatably disposed in the cylinder and configured to partition the cylinder into a first fluid chamber and a second fluid chamber, the piston including a sliding contact portion configured to come into sliding contact with an inner circumferential surface of the cylinder; and
a piston rod secured to the piston at one end thereof,
the piston comprising:
an inner yoke including a magnetic material,
a magnetic coil disposed along an outer circumference of the inner yoke,
an outer yoke including a magnetic material and surrounding the magnetic coil,
a valve seat being formed integrally with the inner yoke or the outer yoke,
a valve plate including a magnetic material, pressed to and brought into contact with the valve seat and configured to form an opening between the valve seat and the valve plate at a time of valve opening operation,
valve holder configured to support the valve plate and having the sliding contact portion on an outer circumferential surface thereof, and
an annular fluid passage formed between an outer circumferential surface of the outer yoke and the inner circumferential surface of the cylinder to communicate with the first fluid chamber, and partitioned from the second fluid chamber by the sliding contact portion,
wherein the variable damping-force damper controls a damping force by supplying a current to the magnetic coil, the damping force being generated when the hydraulic fluid passes from the first fluid chamber to the second fluid chamber,
wherein a first hydraulic fluid passage and a second hydraulic fluid passage are separately provided, the first hydraulic fluid passage extending from the first fluid chamber to the second fluid chamber through the annular fluid passage, an inlet hole formed at the outer circumference of the outer yoke, the opening formed between the valve seat and the valve plate, and a first fluid passage formed in the valve holder, and the second hydraulic fluid passage extending to the first fluid chamber through a second fluid passage formed in the valve holder and the annular fluid passage, the second hydraulic fluid passage being provided with a first one-way valve configured to pass a hydraulic fluid from the second fluid chamber to the annular fluid passage only.

2. The variable damping-force damper according to claim 1,
wherein the piston includes a pressure-maintaining chamber on the second fluid chamber side of the valve plate.

3. The variable damping-force damper according to claim 1, further comprising
a passage forming member including a non-magnetic material, the passage forming member being provided between a distal end of the inner yoke and a distal end of the outer yoke, and
a sealing unit provided between the passage forming member and the magnetic coil and configured to prevent entry of the hydraulic fluid into the magnetic coil.

4. The variable damping-force damper according to claim 3,
wherein the outer yoke and the passage forming member each include a rotation controller configured to control relative rotation of the outer yoke with respect to the passage forming member.

5. The variable damping-force damper according to claim 1,
wherein the outer yoke includes an extending portion projecting radially inwardly at an end thereof located closer to the valve plate.

6. The variable damping-force damper according to claim 1,
wherein the valve plate includes a base portion, the base portion including a discharge hole constituting a part of the first hydraulic fluid passage.

7. The variable damping-force damper according to claim 1,
wherein the first hydraulic fluid passage includes a second one-way valve configured to pass a hydraulic fluid from the first fluid chamber to the second fluid chamber only.

8. The variable damping-force damper according to claim 7,
wherein the valve holder comprises a valve plate retainer and a one-way valve retainer, the valve plate retainer being configured to support the valve plate, and the one-way valve retainer being configured to integrally hold the first one-way valve and the second one-way valve, and including a piston ring constituting the sliding contact portion provided on an outer circumferential surface thereof.

9. The variable damping-force damper according to claim 1,
wherein the piston includes a pressure-maintaining chamber partially defined by a rear surface of the valve plate such that the pressure-maintaining chamber applies a pressure to the rear surface of the valve plate when the pressure-maintaining chamber is filled with the hydraulic fluid.

10. The variable damping-force damper according to claim 9,
wherein the pressure-maintaining chamber constitutes a part of the first hydraulic fluid passage.

11. The variable damping-force damper according to claim 9,
wherein the valve plate obstructs the first hydraulic fluid passage such that a front surface of the valve plate receives the hydraulic fluid flowing from the first fluid chamber toward the second fluid chamber.

12. The variable damping-force damper according to claim 1,
wherein the valve plate is securely supported at one end thereof so as to be elastically deformed by the received hydraulic fluid.

* * * * *